United States Patent [19]
Murray

[11] Patent Number: 5,797,615
[45] Date of Patent: Aug. 25, 1998

[54] HEAVY EQUIPMENT TRAILER WITH ADJUSTABLE TOWER

[75] Inventor: Douglas Glen Murray, Stockton, Calif.

[73] Assignee: Harley Murray, Inc., Stockton, Calif.

[21] Appl. No.: 777,828

[22] Filed: Dec. 31, 1996

[51] Int. Cl.$^6$ ........................................ B60D 1/44
[52] U.S. Cl. ........................ 280/441.2; 280/441.1; 280/490.1; 280/425.2; 280/407.1; 414/481; 414/495
[58] Field of Search ................. 280/405.1, 423.1, 280/425.1, 425.2, 433, 438.1, 441.1, 441.2, 476.1, 490.1, 407.1, 656; 414/481, 495

[56] References Cited

U.S. PATENT DOCUMENTS

| | | | |
|---|---|---|---|
| 1,117,966 | 11/1914 | Blaisdell | 280/438.1 |
| 4,050,707 | 9/1977 | Glumac | 280/438.1 |
| 4,060,145 | 11/1977 | Kingman et al. | 280/423.1 |
| 4,061,353 | 12/1977 | Kingman et al. | 280/423.1 |
| 5,005,851 | 4/1991 | McGhie et al. | 280/407.1 |

*Primary Examiner*—Kevin Hurley
*Attorney, Agent, or Firm*—Flehr Hobbach Test Albritton & Herbert LLP

[57] ABSTRACT

Heavy equipment trailer having a main deck with a rear gooseneck which is connected to a turntable mounted on a lifting tower carried by a dolly positioned to the rear of the deck. The lifting tower is mounted in a box which is suspended between the side rails of the dolly frame in a manner permitting the box to be shifted longitudinally of the rails to adjust weight distribution between wheel sets at the front and rear of the dolly.

6 Claims, 5 Drawing Sheets

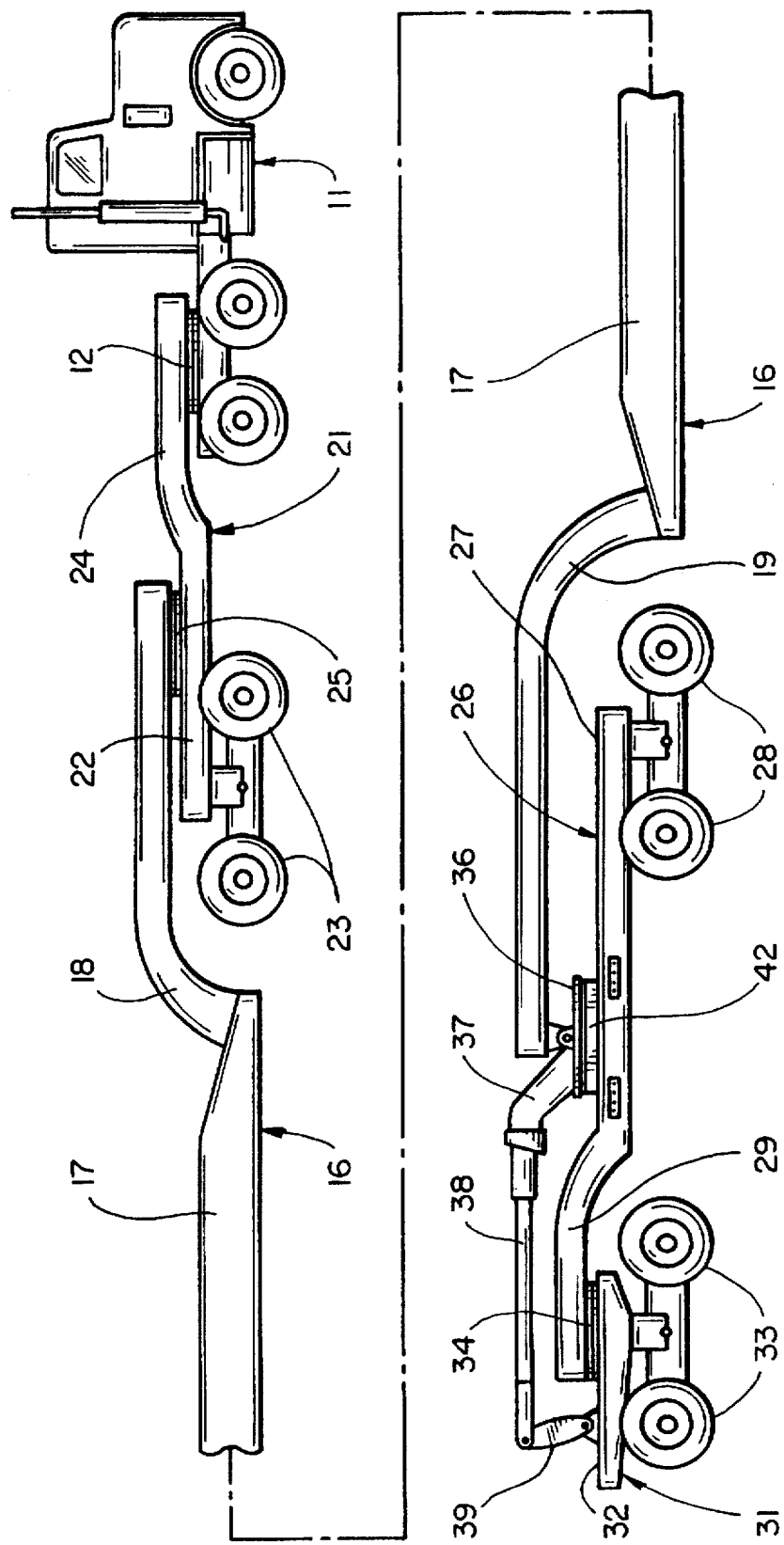

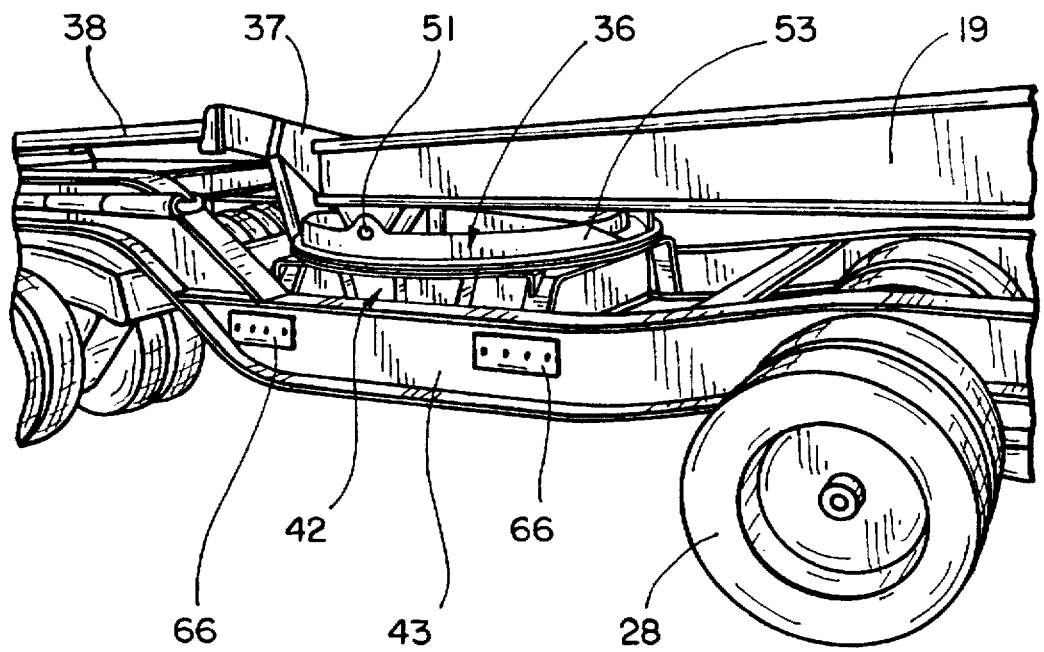
FIG_2
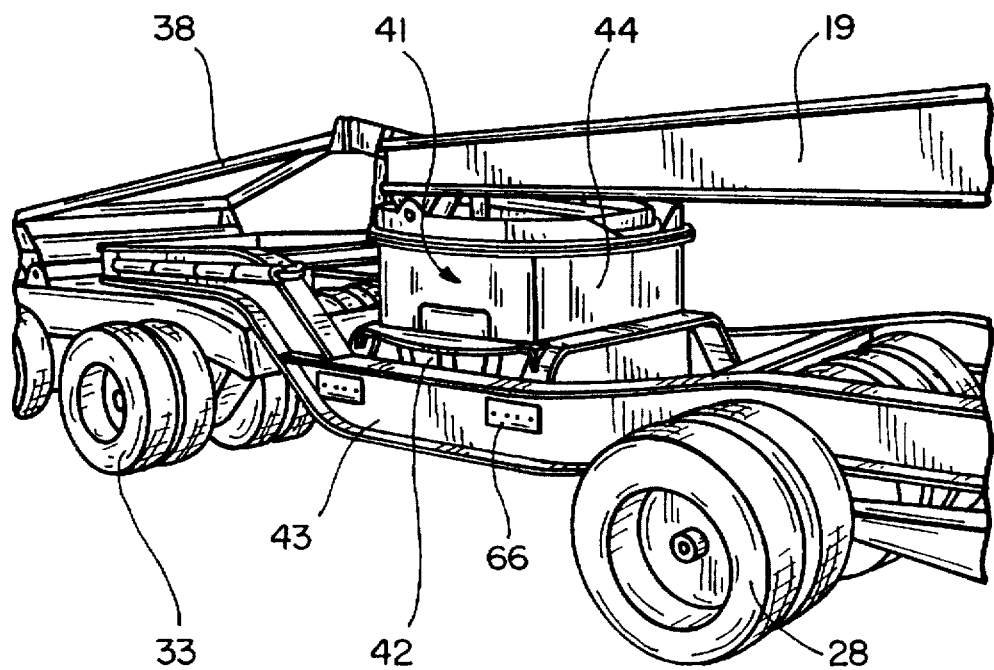
FIG_3

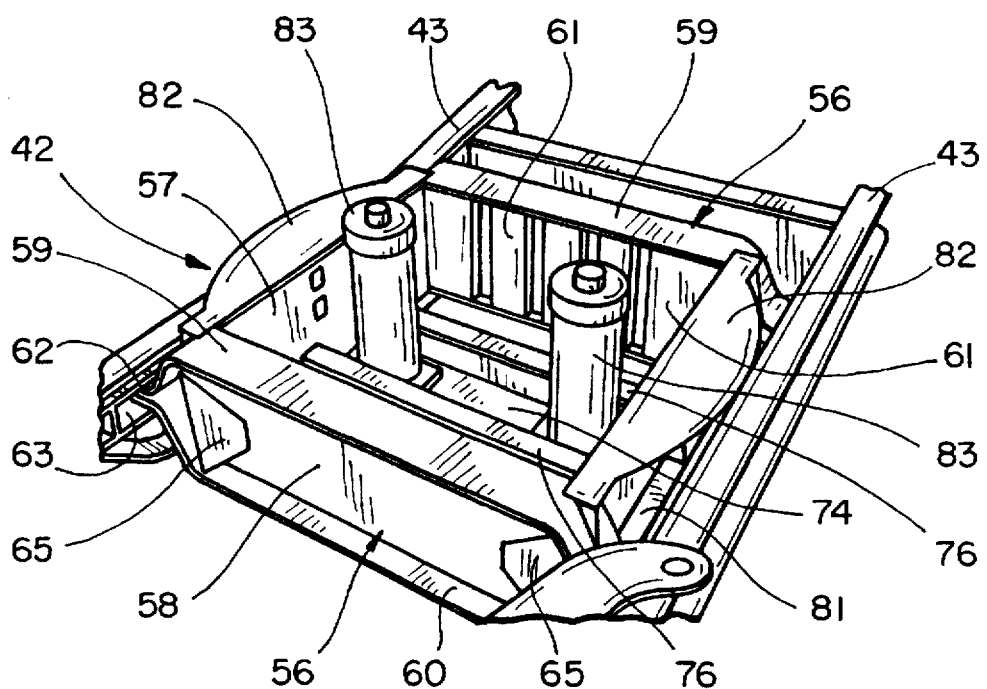
FIG_4
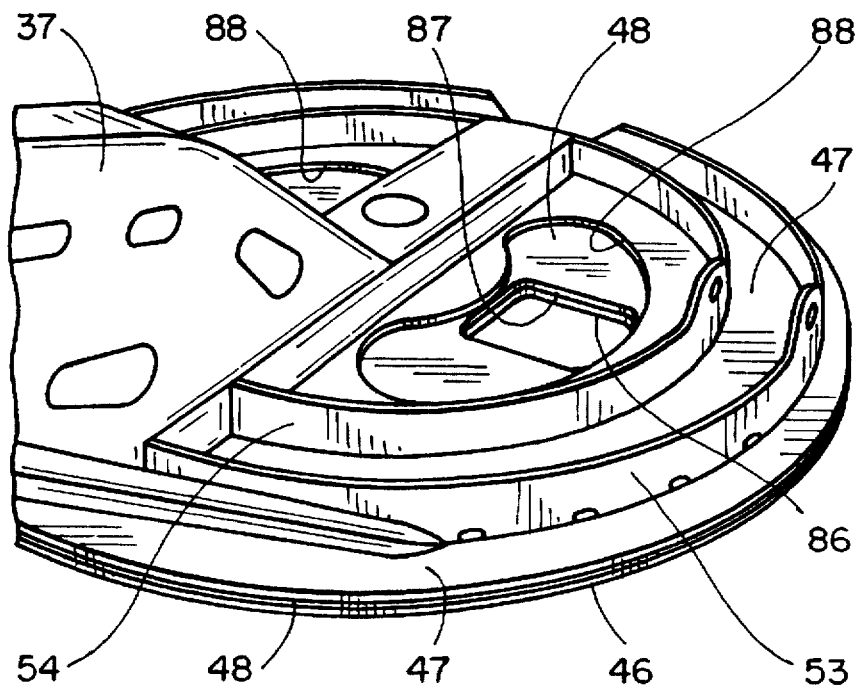
FIG_5

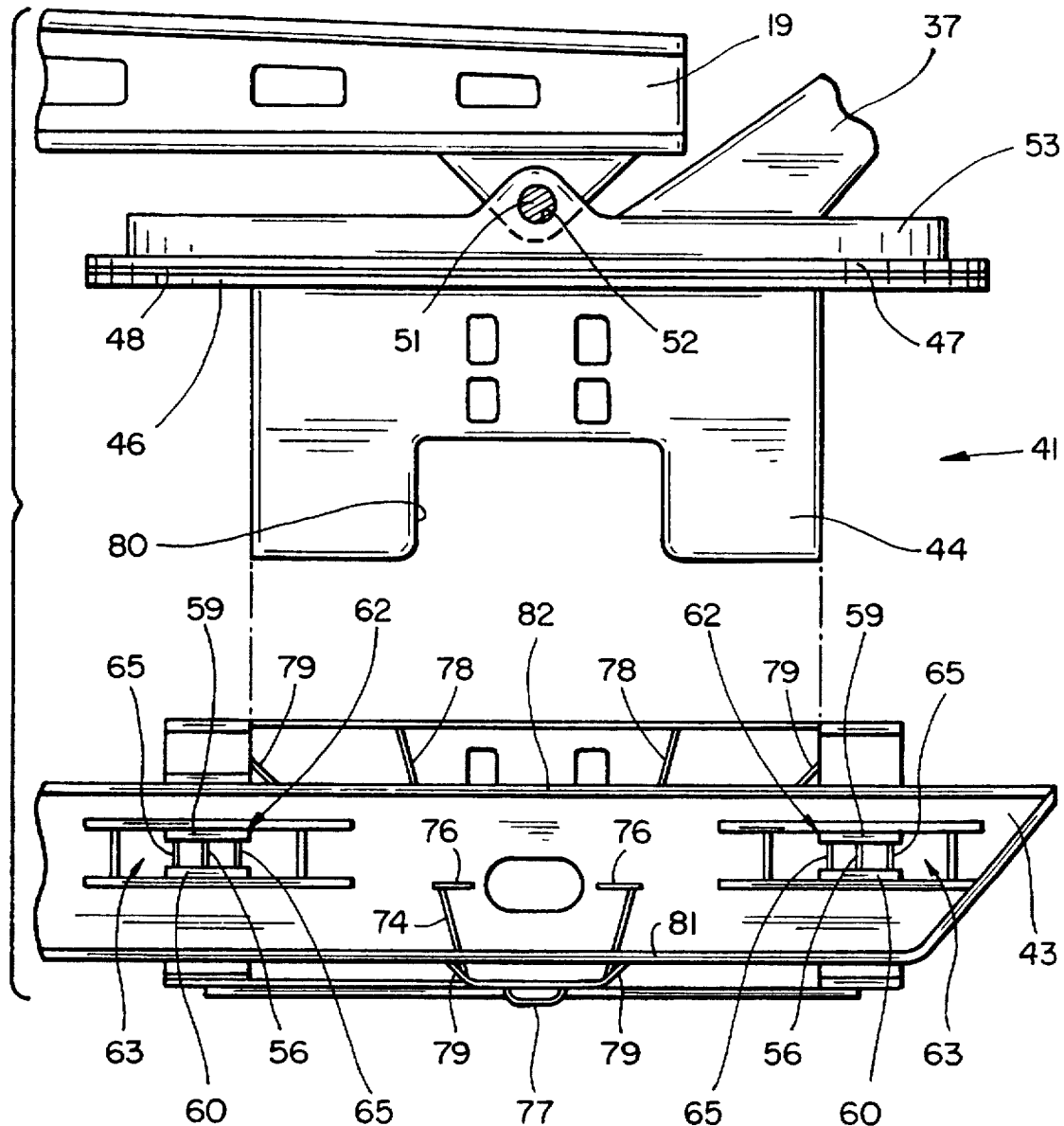
FIG_6

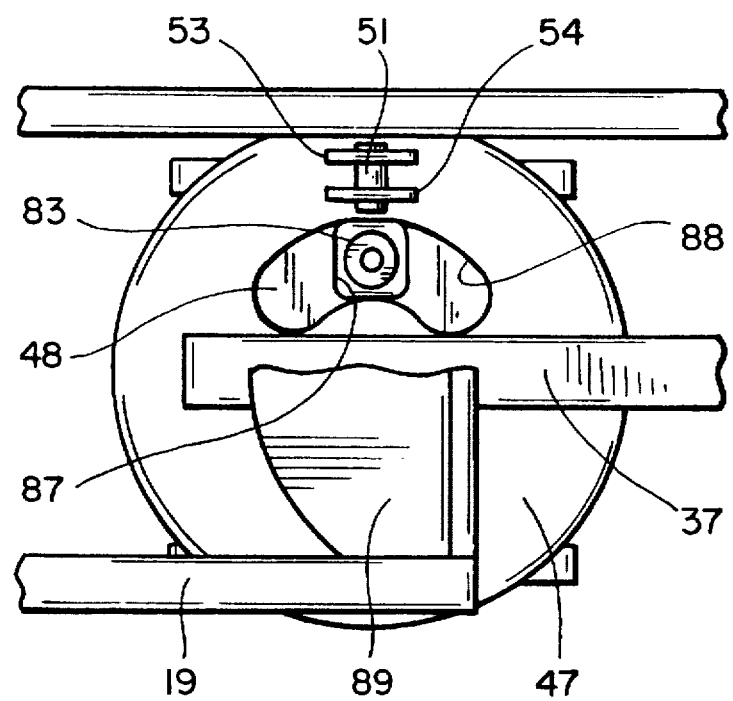
FIG_7
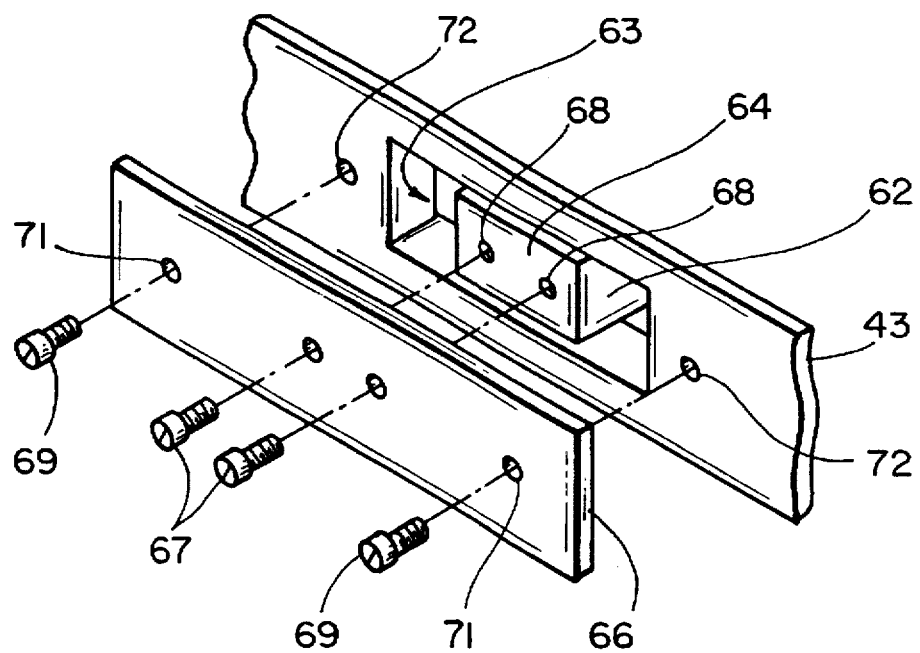
FIG_8

HEAVY EQUIPMENT TRAILER WITH ADJUSTABLE TOWER

This invention pertains generally to trailers and, more particularly, to a trailer for carrying large, heavy loads such as construction equipment.

One example of a trailer for carrying heavy construction equipment and other heavy or bulky loads is found in U.S. Pat. No. 4,484,758. That trailer is self-steering in that it has a dolly which supports the rear portion of a main deck and is linked to the deck in such manner that the dolly turns in response to lateral movement of the deck to steer the rear of the trailer around turns or curves. Such steering eliminates a tendency to cut across corners, and also provides better control of the trailer when backing up.

With such trailers, it sometimes necessary to raise the rear portion of the deck, which generally requires disconnection of a gooseneck from the dolly and the use of a special jack. It is desirable to distribute the load carried by the deck as evenly as possible between the wheels of the rear dolly.

It is in general an object of the invention to provide a new and improved trailer for carrying large, heavy loads such as construction equipment.

Another object of the invention is to provide a trailer of the above character which overcomes the limitations and disadvantages of the prior art.

These and other objects are achieved in accordance with the invention by providing a trailer having a main deck with a rearwardly extending gooseneck, a dolly positioned to the rear of the main deck having a pair of longitudinally extending side rails supported by ground engaging wheels toward the front and rear of the dolly, a lifting tower mounted in a box suspended between the side rails, a turntable carried by the lifting tower, means connecting the gooseneck to the turntable so that the rear portion of the deck is supported by the tower, means for raising/lowering the tower relative to the box, and means mounting the box to the side rails in a manner permitting the box to be shifted longitudinally of the rails to adjust weight distribution between the wheels at the front and rear of the dolly.

FIG. 1 is side elevational view, somewhat schematic, of one embodiment of a trailer incorporating the invention.

FIG. 2 is fragmentary isometric view of the embodiment of FIG. 1, showing the lifting tower in its lowered position.

FIG. 3 is view similar to FIG. 2, showing the lifting tower in a raised position.

FIG. 4 is a fragmentary isometric view of the embodiment of FIG. 1, with the lifting tower removed.

FIG. 5 is an isometric view of the lifting tower in the embodiment of FIG. 1.

FIG. 6 is an exploded elevational view illustrating the lifting tower and the box which supports it in the embodiment of FIG. 1.

FIG. 7 is a fragmentary top plan view, partly broken away, of the lifting tower in the embodiment of FIG. 1.

FIG. 8 is an exploded isometric view illustrating the manner in which the box which supports the lifting tower is adjustably mounted to the frame of the dolly in the embodiment of FIG. 1.

In the drawings, the trailer is illustrated in connection with a pulling vehicle 11 such as a truck or tractor of conventional design. This vehicle has a fifth wheel 12 to which the trailer is connected.

The trailer comprises a main deck section 16 for receiving the equipment or other load to be carried. This section includes an elongated deck 17, with front and rear goosenecks 18, 19 projecting from the deck. The front gooseneck is detachably connected to the deck to facilitate loading and unloading of the load to be carried. One suitable means for connecting the detachable gooseneck to the deck is described in detail in U.S. Pat. No. 3,326,572.

The front of the deck section is supported by a jeep 21 that includes a frame 22, wheels 23, and a gooseneck 24 which is connected to the fifth wheel 12 of the pulling vehicle. The front gooseneck 18 of the deck section is connected to a fifth wheel 25 carried by the frame of the jeep.

The rear of the deck section is supported by a dolly 26 which includes a deck 27, a set of wheels 28 beneath the front portion of the deck, and a gooseneck 29 which extends rearwardly from the deck. A steering dolly 31 having a deck 32 and wheels 33 is positioned beneath gooseneck 29, and that gooseneck is connected to a turntable 34 on deck 32. The rear gooseneck 19 of the main deck 16 is connected to a turntable 36 on deck 27, as described hereinafter in greater detail. A short gooseneck or steering arm 37 extends rearwardly from turntable 36 and is connected to the steering dolly by a an A-frame 38 and links 39 to provide self-steering for the rear portion of the trailer.

Turntable 36 is mounted on a lifting tower 41 which is mounted in a box 42 suspended between the side rails or frame members 43 of dolly 27. The tower has a rectangular side wall or skirt 44 and a circular top plate 46. The turntable includes a circular plate 47 which is rotatively mounted on top plate 46, with a layer of material 48 between the plates serving as a bearing. A presently preferred material for the bearing is ultra high molecular weight (UHMW) plastic. The bearing plate is affixed to plate 47 by suitable means such as bolts or an adhesive (not shown).

The rear gooseneck 19 of main deck 16 is pivotally connected to turntable 36 by pins 51 which are received in diametrically aligned bores 52 in a pair of upstanding concentric flanges 53, 54 on the upper side of plate 47. Steering arm 37 is also affixed to this plate and extends in a direction perpendicular to the axis of the pins.

The box in which the tower is mounted has side walls 56 which extend transversely of the trailer axis and end walls 57 which are parallel to the axis. The side walls are in the form of I-beams, with upstanding webs 58 and flanges 59, 60 extending along the upper and lower edges of the webs. The side wall or skirt of the tower is telescopically received in the box, with blocks of UHMW 61 mounted on the inner sides of side walls 56 to provide guides and bearings for the tower.

The outer end portions of flanges 59, 60 are brought together to form tongues 62 which project laterally from the box and into pockets 63 in the side rails of the dolly frame. The pockets are horizontally elongated and permit the position of the tower and the box to be adjusted longitudinally to control distribution of the load between the front and rear wheels of the dolly. End plates 64 are welded between the outer ends of the flanges, and gusset plates 65 are welded between the side faces of webs 58, the outer portions of flanges 59, 60 and the end plates. Lock plates 66 are bolted to the end plates and to the side rails secure the box in a desired position.

Each of the lock plates is secured to the outer end of one of the tongues by bolts 67 received in threaded holes 68 in end plates 64. The lock plates are secured to the side rails by bolts 69 which pass through holes 71 in the lock plates and holes 72 in the side rails. If desired, one or both of those holes can be drilled "in place" after the box and tower have been set in the desired position.

A cross-member in the form of a U-shaped channel 74 extends across the lower portion of box 42 between end walls 57. Flanges 76 extend along the upper edges of the channel, and a cross-brace 77 is located beneath the channel. The channel extends through the end walls, and braces 78, 79 extend upwardly and outwardly between flanges 81, 82 at the lower and upper edges of the end walls. The lower portions of the side walls of the tower skirt are cut away or notched, as indicated at 80, to clear the channel.

Hydraulic cylinders or rams 83 are mounted in the channel toward opposite sides of the dolly for raising the tower and the rear portion of deck 16. The rams are mounted in an upright position and extend through openings 86–88 in top plate 46, bearing plate 48 and turntable plate 47, and bear against the under side of gooseneck 19. For this purpose, a semicircular plate 89 is mounted inside the gooseneck pan. The openings 88 in plate 47 are arcuately elongated so that the rams can engage the semicircular plate to lift the deck even when the deck is turned at an angle to the dolly.

The invention has a number of important features and advantages. The trailer is self-steering, and the rear of the trailer is steered automatically around turns, with the amount of steering varying in accordance with the sharpness of the turns. The rear portion of the deck can be raised without using an external jack and without disconnecting the deck from the dolly, and the point at which the load is applied to the dolly can be adjusted to distribute the load evenly between the front and rear wheels of the dolly. That permits heavier loads to be carried than would be possible if the load were distributed unevenly or concentrated on one of the sets of wheels.

It is apparent from the foregoing that a new and improved trailer has been provided. While only certain presently preferred embodiments have been described in detail, as will be apparent to those familiar with the art, certain changes and modifications can be made without departing from the scope of the invention as defined by the following claims.

I claim:

1. In a trailer for carrying loads such as heavy equipment: a main deck having a rearwardly extending gooseneck, a dolly positioned to the rear of the main deck having a pair of longitudinally extending side rails supported by ground engaging wheels toward the front and rear of the dolly, a lifting tower mounted in a box suspended between the side rails, a turntable carried by the lifting tower, means connecting the gooseneck to the turntable so that the rear portion of the deck is supported by the tower, means for raising/lowering the tower relative to the box, and means mounting the box to the side rails in a manner permitting the box to be shifted longitudinally of the rails to adjust weight distribution between the wheels at the front and rear of the dolly.

2. The trailer of claim 1 wherein the means mounting the box to the side rails includes longitudinally elongated pockets formed in the side rails, laterally extending tongues projecting from the box into the pockets, and means securing the tongues in predetermined positions in the pockets.

3. The trailer of claim 1 wherein the means securing the tongues in predetermined positions in the pockets comprises lock plates affixed to the tongues and to the side rails.

4. The trailer of claim 1 wherein the means for raising/lowering the tower includes a hydraulic cylinder having a base mounted to the box and a ram which extends through an opening in the turntable and engages the gooseneck in a lifting relationship.

5. The trailer of claim 4 wherein the opening in the turntable is arcuate and the ram can engage the gooseneck through the opening when the gooseneck and the turntable are in different rotational positions relative to the dolly.

6. The trailer of claim 1 wherein the rear wheels of the dolly are steerable, and a steering arm is affixed to the turntable and linked to the rear wheels for steering the rear of the trailer in response to lateral movement of the gooseneck.

* * * * *